United States Patent
Zhen et al.

(10) Patent No.: US 12,032,584 B2
(45) Date of Patent: Jul. 9, 2024

(54) DATA MANAGEMENT METHOD AND SYSTEM FOR A SECURITY PROTECTION TERMINAL, DEVICE AND STORAGE MEDIUM

(71) Applicant: INSPUR SUZHOU INTELLIGENT TECHNOLOGY CO., LTD., Jiangsu (CN)

(72) Inventors: Peng Zhen, Jiangsu (CN); Chao Tang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/250,212

(22) PCT Filed: Jul. 30, 2021

(86) PCT No.: PCT/CN2021/109470
§ 371 (c)(1),
(2) Date: Apr. 23, 2023

(87) PCT Pub. No.: WO2022/083211
PCT Pub. Date: Apr. 28, 2022

(65) Prior Publication Data
US 2024/0037113 A1 Feb. 1, 2024

(30) Foreign Application Priority Data
Oct. 23, 2020 (CN) .......................... 202011147185.0

(51) Int. Cl.
*G06F 16/2458* (2019.01)
*G06F 16/2455* (2019.01)

(52) U.S. Cl.
CPC .... *G06F 16/2471* (2019.01); *G06F 16/24558* (2019.01)

(58) Field of Classification Search
CPC ...................... G06F 16/2471; G06F 16/24558
See application file for complete search history.

(56) References Cited

U.S. PATENT DOCUMENTS

| 2005/0065889 | A1* | 3/2005 | Benaloh | G11B 20/00086 |
| | | | | 705/51 |
| 2015/0193711 | A1 | 7/2015 | Lavrov et al. | |
| 2016/0371336 | A1* | 12/2016 | Dickie | G06F 16/24554 |

FOREIGN PATENT DOCUMENTS

| CN | 102298716 A | 12/2011 |
| CN | 107203532 A | 9/2017 |

(Continued)

OTHER PUBLICATIONS

International search report for PCT/CN2021/109470 mailed on Nov. 4, 2021.

(Continued)

*Primary Examiner* — Mark D Featherstone
*Assistant Examiner* — Kweku William Halm
(74) *Attorney, Agent, or Firm* — Dennemeyer & Associates LLC; Victoria Friedman

(57) ABSTRACT

Provided are a data management method and system for a security protection terminal, a device and a medium. The method includes: respectively generating an initial universally unique identifier for each security protection terminal; determining a target search field, calculating corresponding search field identifier information, and inputting the same into the initial universally unique identifier to obtain a target universally unique identifier; storing data corresponding to the security protection terminals in corresponding sub-databases based on a horizontal partitioning and modulus mode according to the target universally unique identifier; and receiving a data search request, and locating to the sub-databases based on the horizontal partitioning and (Continued)

modulus mode according to the target search field identifier information, thereby facilitating subsequent data search in the sub-databases.

20 Claims, 3 Drawing Sheets

(56) References Cited

FOREIGN PATENT DOCUMENTS

| | | |
|---|---|---|
| CN | 108256076 A | 7/2018 |
| CN | 112231446 A | 1/2021 |

OTHER PUBLICATIONS

Search report for Chinese application 202011147185.0 filed Oct. 23, 2020.

* cited by examiner

DATA MANAGEMENT METHOD AND SYSTEM FOR A SECURITY PROTECTION TERMINAL, DEVICE AND STORAGE MEDIUM

CROSS-REFERENCE TO RELATED APPLICATIONS

This is a 35 U.S.C. 371 National Stage Patent Application of International Application No. PCT/CN2021/109470, filed Jul. 30, 2021, which claims priority to Chinese application 202011147185.0, filed Oct. 23, 2020, each of which is hereby incorporated by reference in its entirety.

TECHNICAL FIELD

The present disclosure relates to the field of the computer technology, and more particularly relates to a data management method and system for a security protection terminal, an electronic device and a computer-readable storage medium.

BACKGROUND

With the development of informatization, there are an increasing number of user terminals, and terminals equipped with a security protection function are constantly increased as well, thereby greatly challenging centralized security management. For example, when security issues arise, it is usually necessary to quickly locate target data from a large number of security protection terminals. However, using the names of the security protection terminals for search will cause low search performance due to the huge data volume; and using unique identifiers of the security protection terminals for search requires users to manually input the complex identifiers, which is not conducive to usage and operation by the users.

Therefore, how to solve the aforementioned problems is the key focus for those skilled in the art.

SUMMARY

An objective of the present disclosure is to provide a data management method and system for a security protection terminal, an electronic device and a computer-readable storage medium, thereby avoiding usage inconvenience brought to users due to complex identifier input, and improving search efficiency and performance.

In order to realize the above objective, the present disclosure provides a data management method for a security protection terminal, and the method includes:
respectively generating a corresponding initial universally unique identifier for each security protection terminal;
determining a target search field for terminal data search, calculating corresponding search field identifier information based on the target search field and inputting the search field identifier information into the initial universally unique identifier to obtain a target universally unique identifier;
storing, based on a horizontal partitioning and modulus mode, data corresponding to the security protection terminals into corresponding sub-databases according to the target universally unique identifier;
calculating, upon receipt of a data search request, corresponding target search field identifier information based on an actual target search field in the data search request; and
locating to the sub-databases based on the horizontal partitioning and modulus mode according to the target search field identifier information, so as to perform subsequent data search in the sub-databases.

In an embodiment, the determining a target search field for terminal data search, and calculating corresponding search field identifier information based on the target search field includes:
determining a name of the security protection terminal as the target search field; and
calculating a first Hash value of the target search field, converting the first Hash value into a binary number, and then extracting preset-length data from the end of a converted first number to serve as the search field identifier information.

In an embodiment, the inputting the search field identifier information into the initial universally unique identifier to obtain a target universally unique identifier includes:
converting the initial universally unique identifier into a binary number to obtain a binary identifier; and
substituting a corresponding length number at the end of the binary identifier according to the search field identifier information to obtain the target universally unique identifier.

In an embodiment, the storing, based on a horizontal partitioning and modulus mode, data corresponding to the security protection terminals in corresponding sub-databases according to the target universally unique identifier includes:
calculating the sub-databases corresponding to the security protection terminals based on the horizontal partitioning and modulus mode according to the target universally unique identifier corresponding to the security protection terminals; and
storing the data corresponding the security protection terminals in the sub-databases.

In an embodiment, before the storing, based on a horizontal partitioning and modulus mode, data corresponding to the security protection terminals in corresponding sub-databases according to the target universally unique identifier, the method further includes:
determining the actual total quantity of the security protection terminals, and determining the quantity of the sub-databases based on the total quantity.

In an embodiment, the calculating, upon receipt of a data search request, corresponding target search field identifier information based on an actual target search field in the data search request includes:
acquiring, upon receipt of the data search request, the actual target search field in the data search request; and
calculating a second Hash value corresponding to the actual target search field, converting the second Hash value into a binary number, and extracting preset-length data from the end of a converted second number to serve as the target search field identifier information.

In order to realize the above objective, the present disclosure provides a data management system for a security protection terminal, and the system includes:
an initial identifier generation module configured to respectively generate a corresponding initial universally unique identifier for each security protection terminal;
a target identifier generation module configured to determine a target search field for terminal data search, calculate corresponding search field identifier information based on the target search field and input the search field identifier information into the initial universally unique identifier to obtain a target universally unique identifier;

a horizontal partitioning storage module configured to store, based on a horizontal partitioning and modulus mode, data corresponding to the security protection terminals in corresponding sub-databases according to the target universally unique identifier;

a search identifier determine module configured to calculate, upon receipt of a data search request, corresponding target search field identifier information based on a target search field in the data search request; and a sub-database positioning module configured to locate to sub-databases based on the horizontal partitioning and modulus mode according to the target search field identifier information, so as to perform subsequent data search in the sub-databases.

In an embodiment, the target identifier generation module includes:

a target determine unit configured to determine a name of the security protection terminal as the target search field; and an identifier extraction unit configured to calculate a first Hash value of the target search field, convert the first Hash value into a binary number, and then extract preset-length data from the end of a converted first number to serve as the search field identifier information.

In order to realize the above objective, the present disclosure provides an electronic device, including:

a memory configured to store computer programs; and a processor configured to execute the computer programs to implement the steps of any data management method provided above.

In order to realize the above objective, the present disclosure provides a computer-readable storage medium. The computer-readable storage medium stores computer programs, and the computer programs are executed by the processor to implement the steps of any data management method for a security protection terminal provided above.

It can be known from the above solution that the data management method for a security protection terminal provided by the present disclosure includes: respectively generating the corresponding initial universally unique identifier for each security protection terminal; determining the target search field for terminal data search, calculating the corresponding search field identifier information based on the target search field, and inputting the search field identifier information into the initial universally unique identifier to obtain the target universally unique identifier; storing the data corresponding to the security protection terminals in the corresponding sub-databases based on the horizontal partitioning and modulus mode according to the target universally unique identifier; upon receipt of the data search request, calculating the corresponding target search field identifier information based on the actual target search field in the data search request; and locating to the sub-databases based on the horizontal partitioning and modulus mode according to the target search field identifier information, thereby facilitating the subsequent data search in the sub-databases. It can be known from the foregoing that in the present disclosure, the initial universally unique identifier can be first determined, into which the search field identifier information is input, to obtain the target universally unique identifier, the large number of terminal data is stored in the sub-databases based on the identifier, and during search, the actually searched target search field identifier information can be calculated, and accordingly, the positions of the sub-databases where the required data is located are determined so as to later perform further search in the located sub-databases, which avoids usage inconvenience brought to the users due to complex identifier input, improves usability, and meanwhile improves search efficiency and performance.

The present disclosure further provides a data management system for a security protection terminal, an electronic device and a computer-readable storage medium, which can similarly realize the above technical effects.

It is to be understood that the above general description and the following detail description are only exemplary and cannot limit the present disclosure.

BRIEF DESCRIPTION OF THE DRAWINGS

In order to describe technical solutions in embodiments of the present disclosure or in the prior art more clearly, drawings required to be used in descriptions of the embodiments or the prior art will be briefly introduced below, it is apparent that the drawings described below are only some embodiments of the present disclosure, and those of ordinary skill in the art can obtain other drawings according to the drawings without creative work.

DETAILED DESCRIPTION OF THE EMBODIMENTS

Technical solutions in embodiments of the present disclosure are clearly and completely described below in combination with drawings in the embodiments of the present disclosure, and it is apparent that the described embodiments are only a part rather all of embodiments of the present disclosure. All other embodiments obtained by those of ordinary skill in art without creative labor based on the embodiments of the present disclosure shall fall within the scope of protection of the present disclosure.

In the related technologies, it is usually necessary to quickly locate target data from a large number of security protection terminals. Using the names of the security protection terminals for search will cause low search performance due to the huge data volume; and using unique identifiers of the security protection terminals for search requires users to manually input the complex identifiers, which is not conducive to usage and operation by the users.

Thus, an embodiment of the present disclosure provides a data management method for a security protection terminal, which avoids usage inconvenience brought to the users due to complex identifier input, and improves usability.

Figure 1:
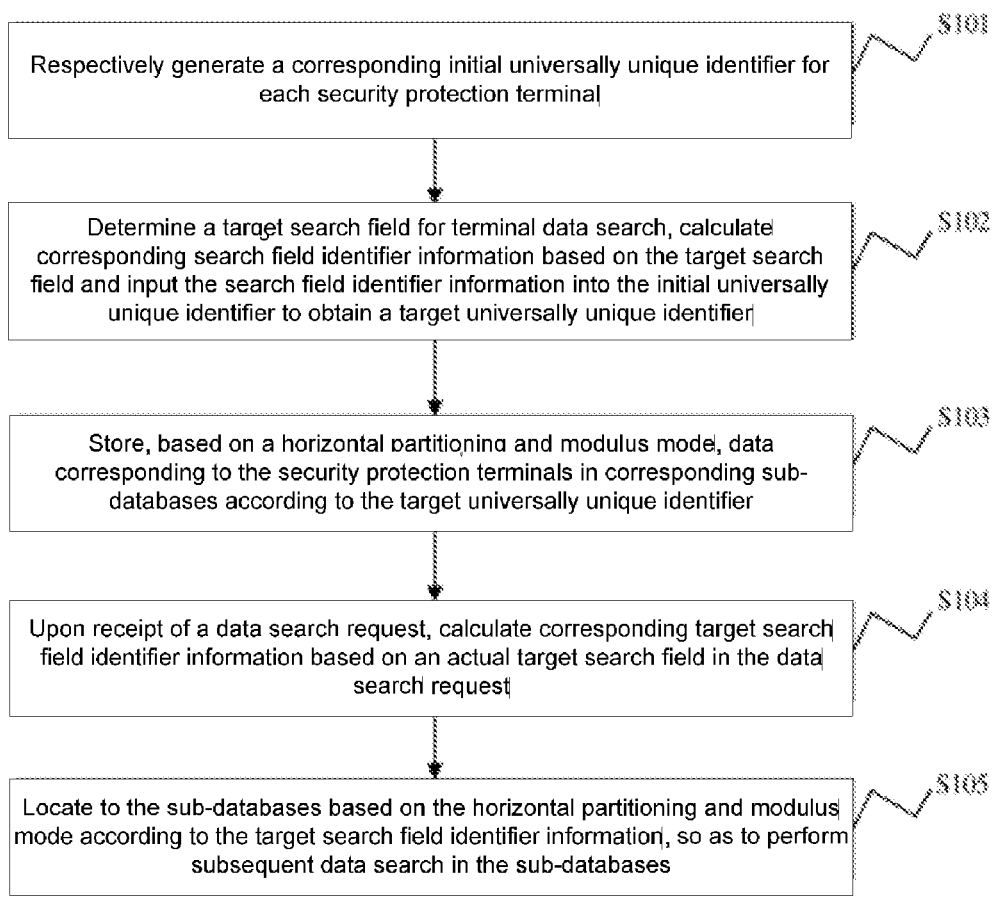
FIG. 1 is a flowchart of a data management method for a security protection terminal provided by an embodiment of the present disclosure.

Please refer to FIG. 1, the embodiment of the present disclosure provides the data management method for a security protection terminal, including:

S101: Respectively generate a corresponding initial universally unique identifier for each security protection terminal.

In the embodiment of the present disclosure, the corresponding initial universally unique identifier for each security protection terminal can be first generated. The universally unique identifier (UUID) is a standard for software construction, and is also a part of the open software foundation organization in the field of distributed computation, which aims to make all elements in a distributed system have unique identifier information without being specified by a central control end. Everyone can create the UUID not conflicting with others, and thus, it is unnecessary to consider the problem of name repetition during database creation.

S102: Determine a target search field for terminal data search, calculate corresponding search field identifier information based on the target search field and input the search field identifier information into the initial universally unique identifier to obtain a target universally unique identifier.

In the step, the target search field can be determined and is in some embodiments used for terminal data search. Then, based on the target search field, the corresponding search field identifier information is calculated and input into the initial universally unique identifier to obtain the target universally unique identifier.

During specific implementation, the process of calculating the search field identifier information may include: determining the name of the security protection terminal as the target search field. A first Hash value of the target search field is calculated and converted into a binary number, and then preset-length data is extracted from the end of a converted first number to serve as the search field identifier information.

When the search field identifier information is input into the initial universally unique identifier to obtain the target universally unique identifier, the initial universally unique identifier can be first converted into a binary number to obtain a binary identifier; and a corresponding length number at the end of the binary identifier is substituted according to the search field identifier information to obtain the target universally unique identifier.

S103: Store, based on a horizontal partitioning and modulus mode, data corresponding to the security protection terminals in corresponding sub-databases according to the target universally unique identifier.

In the step, the data corresponding to the security protection terminals can be stored in the corresponding sub-databases based on the horizontal partitioning and modulus mode according to the above determined target universally unique identifier. In some embodiments, the sub-databases corresponding to the security protection terminals can be first calculated based on the horizontal partitioning and modulus mode according to the target universally unique identifier corresponding to the security protection terminals; and then the data corresponding to the security protection terminals can be stored in the sub-databases.

It is to be explained that during database design in large and medium-sized projects, considering the maximum loaded data volume of a database, the database or a data table is commonly horizontally segmented so as to reduce the pressure of the single database or table, namely database horizontal partitioning. Database horizontal partitioning can reduce the load of a single machine, and meanwhile reduces losses caused by crash to the maximum degree. Through a load balance strategy, the access load of the single machine is effectively reduced, and possibility of crash is reduced; through a cluster solution, the problem that a single-point database cannot be accessed due to database crash is solved; and through a read/write splitting strategy, the speed of data reading and the concurrency value during application are improved to the maximum degree.

As a feasible implementation of the embodiment of the present disclosure, before storing, based on the horizontal partitioning and modulus mode, the data corresponding to the security protection terminals in the corresponding sub-databases according to the target universally unique identifier, the actual total quantity of the security protection terminals can be pre-determined, and the quantity of the sub-databases is determined based on the total quantity. That is, the quantity of the sub-databases can be adjusted according to the total quantity scale of the security protection terminals. As a feasible implementation, the quantity of the sub-databases may be in some embodiments the multiple of two, thereby facilitating implementation of horizontal partitioning.

S104: Upon receipt of a data search request, calculate corresponding target search field identifier information based on an actual target search field in the data search request.

It is to be understood that upon receipt of the data search request, the actual target search field in the data search request can be first acquired, and then the corresponding target search field identifier information is calculated. In some embodiments, a second Hash value corresponding to the actual target search field can be calculated and converted into a binary number, and then preset-length data is extracted from the end of a converted second number to serve as the target search field identifier information.

S105: Locate to the sub-databases based on the horizontal partitioning and modulus mode according to the target search field identifier information, so as to perform subsequent data search in the sub-databases.

In the actual search process, after the target search field identifier information is calculated, the corresponding sub-databases can be located based on the horizontal partitioning and modulus mode, and thus required terminal data can be later searched in the database according to other search conditions.

It can be known from the above solution that the data management method for a security protection terminal provided by the present disclosure includes: the corresponding initial universally unique identifier is generated for each security protection terminal; the target search field for terminal data search is determined, the corresponding search field identifier information is calculated based on the target search field, and the search field identifier information is input into the initial universally unique identifier to obtain the target universally unique identifier; the data corresponding to the security protection terminals is stored in the corresponding sub-databases based on the horizontal partitioning and modulus mode according to the target universally unique identifier; upon receipt of the data search request, the corresponding target search field identifier information is calculated based on the actual target search field in the data search request; and the sub-databases are located based on the horizontal partitioning and modulus mode according to the target search field identifier information, and accordingly the subsequent data search is facilitated in the sub-databases. It can be known from the foregoing that in the present disclosure, the initial universally unique identifier can be first determined, into which the search field identifier information is input, to obtain the target universally unique identifier, the large number of terminal data is stored in the sub-databases based on the identifier, and during search, the actually searched target search field identifier information can be calculated, and accordingly, the positions of the sub-databases where the required data is located are determined so as to later perform further search in the located sub-databases, which avoids usage inconvenience brought to the users due to complex identifier input, improves usability, and meanwhile improves search efficiency and performance.

The data management method for a security protection terminal provided by the embodiment of the present disclosure is introduced according to a specific implementation scene below. In the embodiment of the present disclosure, during storage, the unique identifier (ID) of each security protection terminal serves as a segmentation and modulus object, the search field identifier information is input into the ID, and the database is segmented according to the ID based on the horizontal partitioning and modulus algorithm. It should be noted that a remainder obtained after dividing a number by $2^n$ is decided by the last n-digit number of a binary number of the number. That is, the search field identifier information plays a decisive role during database segmentation. During search, the search field identifier information is extracted so as to calculate the positions of the sub-databases where the security protection terminals are located, and then data information of the security protection terminals is acquired from the located sub-databases.

In some embodiments, the data management method for a security protection terminal provided by the embodiment of the present disclosure may include:

Step 1: Determine a globally unique identifier of each security protection terminal.

Security protection terminal information is stored in a sharding mode, and thus, a database auto-increment ID cannot be used, and to avoid repetition, the 32-bit UUID can serve as the globally unique identifier Terminal_UUID of the security protection terminals.

Step 2: Calculate a search field Hash value.

A terminal name of the security protection terminal serves as a search field, and a Hash value of the field is calculated to obtain a Terminal_Hash_Code.

Step 3: Determine a shard quantity according to the actual number of the protection terminals. The specific shard quantity is $2^n$ so that a search factor can conveniently acquire a proper value during horizontal partitioning.

Step 4: Extract a search field factor.

The Hash value Terminal_Hash_Code calculated in the step 2 is converted into a binary number, and an n-digit number is extracted from the end of a converted value.

Step 5: Input the search factor into the terminal unique identifier.

The Terminal_UUID obtained in the step 1 is converted into a binary number, an n-digit number at the end of the Terminal_UUID is substituted by the n-digit number extracted in the step 4 to generate a new unique identifier New_Terminal_UUID.

Step 6: Store the generated new unique identifier in a database.

The new unique identifier New_Terminal_UUID generated in the step 5 serves as a primary key, and is subjected to horizontal partitioning and modulus operation (New_Terminal_UUID %$2^n$) to be stored in a corresponding sub-database.

Step 7: Perform rapid search and location.

When search is performed based on the terminal name, the Hash value of the field is first calculated and then converted into the binary number, the n-digit number at the end of the converted value is extracted to be subjected to the horizontal partitioning and modulus operation, accordingly, the position of the sub-database where search data is located is obtained, and then search continues in the sub-database based on other search conditions.

Figure 2:
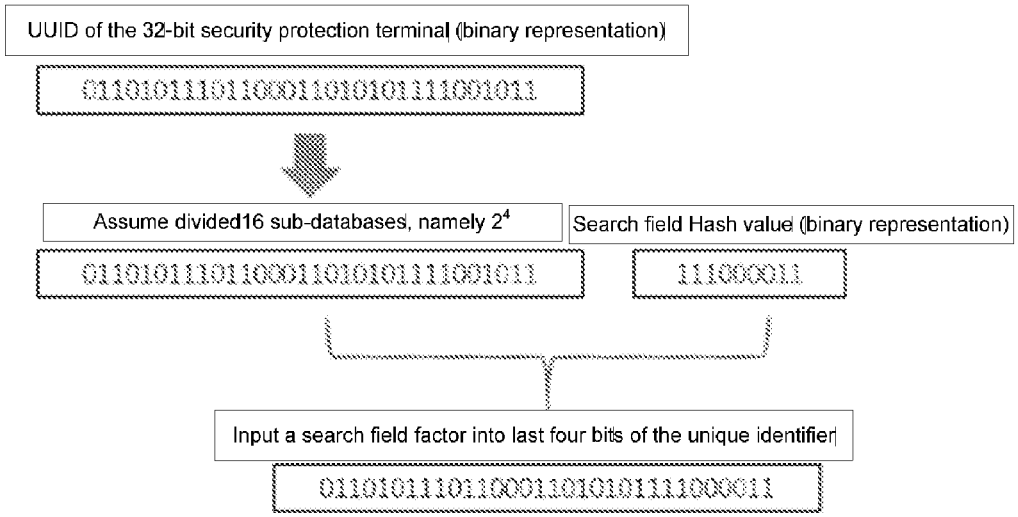
FIG. 2 is a schematic diagram of inputting a search factor into a terminal unique identifier according to an embodiment of the present disclosure.

FIG. 2 provides a specific example of extracting a search field factor and inputting the search field factor into a terminal unique identifier. A globally unique identifier of a security protection terminal is first acquired and converted into a binary number. If a current system is divided into 16 libraries, namely 24, after a Hash value of a search field is converted into a binary number, a four-digit number is required to be extracted from the end of the converted binary number to substitute a last four-digit number of the globally unique identifier, and thus, search factor input is finished, and a new unique identifier is obtained.

A data management system for a security protection terminal provided by an embodiment of the present disclosure is introduced below, and the data management system for a security protection terminal described below and the data management method for a security protection terminal described above can be cross-referenced.

Figure 3:
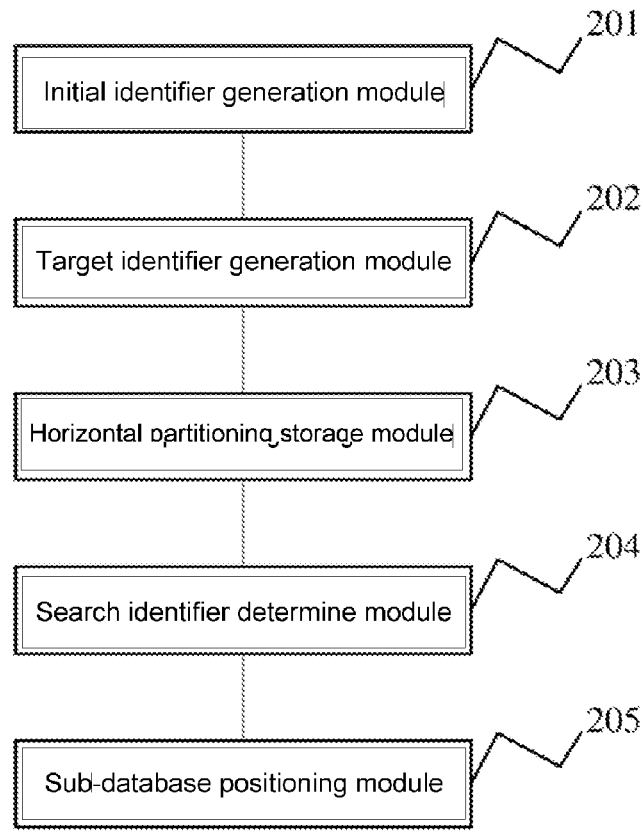
FIG. 3 is a structural diagram of a data management system for a security protection terminal provided by an embodiment of the present disclosure.

Please refer to FIG. 3, the embodiment of the present disclosure provides the data management system for a security protection terminal, including:

an initial identifier generation module 201 configured to respectively generate a corresponding initial universally unique identifier for each security protection terminal;

a target identifier generation module 202 configured to determine a target search field for terminal data search, calculate corresponding search field identifier information based on the target search field and input the search field identifier information into the initial universally unique identifier to obtain a target universally unique identifier;

a horizontal partitioning storage module 203 configured to store, based on a horizontal partitioning and modulus mode, data corresponding to the security protection terminals in corresponding sub-databases according to the target universally unique identifier;

a search identifier determine module 204 configured to calculate, upon receipt of a data search request, corresponding target search field identifier information based on a target search field in the data search request; and a sub-database positioning module 205 configured to locate to sub-databases based on the horizontal partitioning and modulus mode according to the target search field identifier information, so as to perform subsequent data search in the sub-databases.

For specific implementation processes of the above modules 201 to 205, please refer to corresponding contents provided in the foregoing embodiments, and it is unnecessary to repeat herein.

On the basis of the above embodiment, as a preferred implementation, the target identifier generation module 202 may in some embodiments include:

a target determine unit configured to determine a name of the security protection terminal as the target search field; and an identifier extraction unit configured to calculate a first Hash value of the target search field, convert the first Hash value into a binary number, and then extract preset-length data from the end of a converted first number to serve as the search field identifier information.

Figure 4:
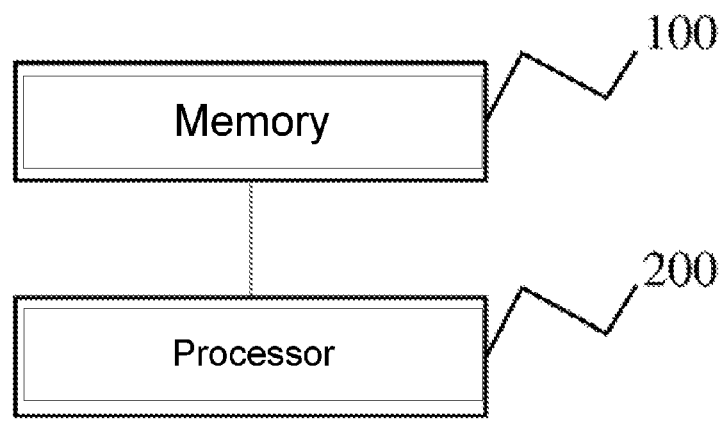
FIG. 4 is a structural diagram of an electronic device provided by an embodiment of the present disclosure.

The present disclosure further provides an electronic device, and as shown in FIG. 4, the electronic device provided by the embodiment of the present disclosure includes:
- a memory 100 configured to store computer programs; and
- a processor 200 configured to execute the computer programs to realize the steps provided in the above embodiments.

In some embodiments, the memory 100 includes a non-volatile storage medium and an internal memory. The non-volatile storage medium stores an operating system and computer-readable instructions, and the internal memory provides an environment for running of the operating system in the non-volatile storage medium and the computer-readable instructions. In some embodiments, the processor 200 may be a central processing unit (CPU), a controller, a microcontroller, a microprocessor or other data processing chips, which provides compute and control capacity for the electronic device, and can execute the computer programs stored in the memory 100 to realize the data management method for a security protection terminal provided in any above embodiment.

Figure 5:
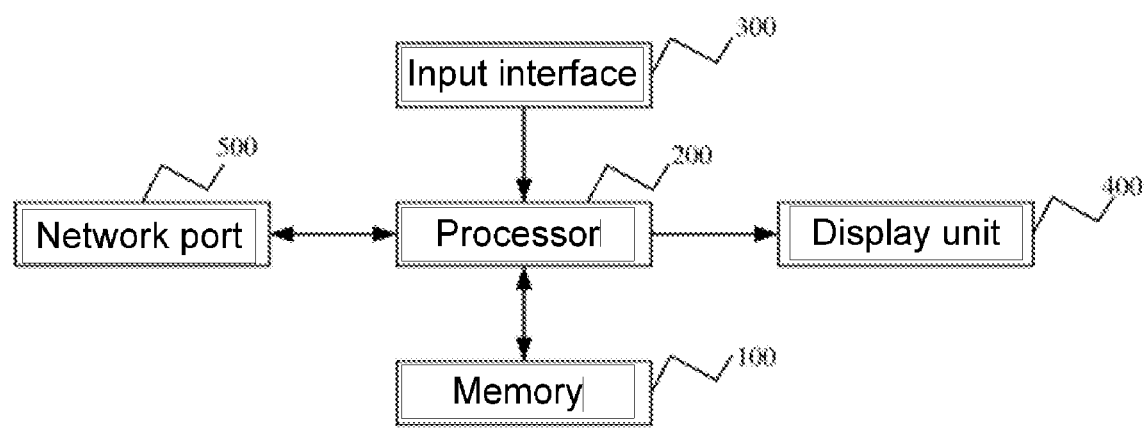
FIG. 5 is a structural diagram of another electronic device provided by an embodiment of the present disclosure.

On the basis of the above embodiment, as a preferred implementation, the electronic device, as shown in FIG. 5, further includes:
- an input interface 300 connected with the processor 200 and configured to acquire computer programs, parameters and instructions imported by a periphery and controlled by the processor 200 to be stored in the memory 100, where the input interface 300 may be connected with an input apparatus and receive parameters or instructions manually input by users, and the input apparatus may be a touch layer covering a display screen, may also be a key, a trackball or a touchpad arranged on a terminal shell, and may also be a keyboard, the touchpad, or a mouse, etc;
- a display unit 400 connected with the processor 200 and configured to display data processed by the processor 200 and display a visual user interface, where the display unit 400 may be a light-emitting diode (LED) display, a liquid crystal display, a touch control type liquid crystal display, an organic light-emitting diode (OLED) touch sensor, etc; and
- a network port 500 connected with the processor 200 and configured to perform communication connection with peripheral terminal devices. A communication technology adopted by the communication connection may be a wired communication technology or a wireless communication technology, such as a mobile high-definition link (MHL)technology, a universal serial bus (USB),a high-definition multimedia interface (HDMI), a wireless fidelity (WiFi) technology, a bluetooth communication technology, a low-power-consumption bluetooth communication technology and an IEEE802.11s-based communication technology.

FIG. 5 only illustrates the electronic device with the modules 100 to 500. Those skilled in the art can understand that the structure shown in FIG. 5 does not limit the electronic device and may include less or more components than components shown in the figure, or combine some components or adopt different component arrangements.

The present disclosure further provides a computer-readable storage medium. The storage medium may include a U disk, a mobile hard disk, a read-only memory (ROM), a random access memory (RAM), a diskette or an optical disk or other media capable of storing program codes. The storage medium may store computer programs, and the computer programs, when executed by a processor, can implement the data management method for a security protection terminalprovided in any above embodiment.

In the present disclosure, the initial universally unique identifier can be first determined,into which the search field identifier information is input, to obtain the target universally unique identifier, the large number of terminal data is stored in the sub-databases based on the identifier, and during search, the actually searched target search field identifier information can be calculated, and accordingly, the positions of the sub-databases where the required data is located are determined so as to later perform further search in the located sub-databases, which avoids usage inconvenience brought to the users due to complex identifier input, improves usability, and meanwhile improves search efficiency and performance.

The embodiments in the description are progressively described, each embodiment emphasizes points different from those in the other embodiments, and the same and similar parts of the embodiments can be cross-referenced. The system provided by the embodiment corresponds to the method provided by the embodiment, and thus, the description is simple, and for associated parts, please refer to the description of the method part. It should be noted that a plurality of improvements and embellishments may also be made on the present disclosure by those of ordinary skill in the technical field without departing from the principle of the present disclosure and should fall within the scope of protection of the present disclosure.

It is to be further explained that relation terms such as first and second in the description are only used for distinguishing one entity or operation from another entity or operation rather than requiring or implying any practical relation or sequence between the entities or operations. In addition, terms "comprise", "include" or any other transformations thereof are intended to cover non-exclusive inclusion, and thus a process, a method, an object or a device including a series of elements not only includes those elements but also includes other elements not clearly listed, or further includes inherent elements for the process, the method, the object or the device. Elements limited by a statement "including a . . . ", without more limitations, indicate that additional same elements may exist in the process, the method, the object or the device including the elements.

What is claimed is:

1. A data management method for a security protection terminal, comprising:
   respectively generating a corresponding initial universally unique identifier for each security protection terminal;
   determining a target search field for terminal data search, calculating corresponding search field identifier information based on the target search field and inputting the search field identifier information into the initial universally unique identifier to obtain a target universally unique identifier;
   storing, based on a horizontal partitioning and modulus mode, data corresponding to the security protection terminals in corresponding sub-databases according to the target universally unique identifier;
   calculating, upon receipt of a data search request, corresponding target search field identifier information based on an actual target search field in the data search request; and
   locating to the sub-databases based on the horizontal partitioning and modulus mode according to the target search field identifier information, so as to perform subsequent data search in the sub-databases.

2. The method according to claim 1, wherein the determining a target search field for terminal data search, and calculating corresponding search field identifier information based on the target search field comprises:
determining a name of the security protection terminal as the target search field; and
calculating a first Hash value of the target search field, converting the first Hash value into a binary number, and then extracting preset-length data from the end of a converted first number to serve as the search field identifier information.

3. The method according to claim 1, wherein the inputting the search field identifier information into the initial universally unique identifier to obtain a target universally unique identifier comprises:
converting the initial universally unique identifier into a binary number to obtain a binary identifier; and
substituting a corresponding length number at the end of the binary identifier according to the search field identifier information to obtain the target universally unique identifier.

4. The method according to claim 1, wherein the storing, based on a horizontal partitioning and modulus mode, data corresponding to the security protection terminals in corresponding sub-databases according to the target universally unique identifier comprises:
calculating the sub-databases corresponding to the security protection terminals based on the horizontal partitioning and modulus mode according to the target universally unique identifier corresponding to the security protection terminals; and
storing the data corresponding the security protection terminals in the sub-databases.

5. The method according to claim 1, wherein the storing, based on a horizontal partitioning and modulus mode, data corresponding to the security protection terminals in corresponding sub-databases according to the target universally unique identifier comprises:
determining the actual total quantity of the security protection terminals, and determining the quantity of the sub-databases based on the total quantity.

6. The method according to claim 5, wherein the calculating, upon receipt of a data search request, corresponding target search field identifier information based on an actual target search field in the data search request comprises:
acquiring, upon receipt of the data search request, the actual target search field in the data search request; and
calculating a second Hash value corresponding to the actual target search field, converting the second Hash value into a binary number, and extracting preset-length data from the end of a converted second number to serve as the target search field identifier information.

7. An electronic device, comprising:
a memory, configured to store a computer program; and
a processor, configured to execute the computer program to:
respectively generate a corresponding initial universally unique identifier for each security protection terminal;
determine a target search field for terminal data search, calculate corresponding search field identifier information based on the target search field and input the search field identifier information into the initial universally unique identifier to obtain a target universally unique identifier;
store, based on a horizontal partitioning and modulus mode, data corresponding to the security protection terminals in corresponding sub-databases according to the target universally unique identifier;
calculate, upon receipt of a data search request, corresponding target search field identifier information based on an actual target search field in the data search request; and
locate to the sub-databases based on the horizontal partitioning and modulus mode according to the target search field identifier information, so as to perform subsequent data search in the sub-databases.

8. A non-transitory computer-readable storage medium, storing a computer program, wherein the computer program is configured to, when executed by a processor, cause the processor to:
respectively generate a corresponding initial universally unique identifier for each security protection terminal;
determine a target search field for terminal data search, calculate corresponding search field identifier information based on the target search field and input the search field identifier information into the initial universally unique identifier to obtain a target universally unique identifier;
store, based on a horizontal partitioning and modulus mode, data corresponding to the security protection terminals in corresponding sub-databases according to the target universally unique identifier;
calculate, upon receipt of a data search request, corresponding target search field identifier information based on an actual target search field in the data search request; and
locate to the sub-databases based on the horizontal partitioning and modulus mode according to the target search field identifier information, so as to perform subsequent data search in the sub-databases.

9. The non transitory computer-readable storage medium according to claim 8, the computer program is further configured to, when executed by the processor, cause the processor to:
determine a name of the security protection terminal as the target search field; and
calculate a first Hash value of the target search field, converting the first Hash value into a binary number, and then extract preset-length data from the end of a converted first number to serve as the search field identifier information.

10. The D transitory computer-readable storage medium according to claim 8, the computer program is further configured to, when executed by the processor, cause the processor to:
convert the initial universally unique identifier into a binary number to obtain a binary identifier; and
substitute a corresponding length number at the end of the binary identifier according to the search field identifier information to obtain the target universally unique identifier.

11. The non-transitory computer-readable storage medium according to claim 8, the computer program is further configured to, when executed by the processor, cause the processor to:
convert the initial universally unique identifier into a binary number to obtain a binary identifier; and
substitute a corresponding length number at the end of the binary identifier according to the search field identifier information to obtain the target universally unique identifier.

12. The non-transitory computer-readable storage medium according to claim 8, the computer program is further configured to, when executed by the processor, cause the processor to:
   determine the actual total quantity of the security protection terminals, and determine the quantity of the sub-databases based on the total quantity.

13. The non-transitory computer-readable storage medium according to claim 12, the computer program is further configured to, when executed by the processor, cause the processor to:
   acquire, upon receipt of the data search request, the actual target search field in the data search request; and
   calculate a second Hash value corresponding to the actual target search field, convert the second Hash value into a binary number, and extract preset-length data from the end of a converted second number to serve as the target search field identifier information.

14. The electronic device according to claim 7, the processor is further configured to:
   determine a name of the security protection terminal as the target search field; and
   calculate a first Hash value of the target search field, converting the first Hash value into a binary number, and then extract preset-length data from the end of a converted first number to serve as the search field identifier information.

15. The electronic device according to claim 7, the processor is further configured to:
   convert the initial universally unique identifier into a binary number to obtain a binary identifier; and
   substitute a corresponding length number at the end of the binary identifier according to the search field identifier information to obtain the target universally unique identifier.

16. The electronic device according to claim 7, the processor is further configured to:
   convert the initial universally unique identifier into a binary number to obtain a binary identifier; and
   substitute a corresponding length number at the end of the binary identifier according to the search field identifier information to obtain the target universally unique identifier.

17. The electronic device according to claim 7, the processor is further configured to:
   determine the actual total quantity of the security protection terminals, and determine the quantity of the sub-databases based on the total quantity.

18. The electronic device according to claim 17, the processor is further configured to:
   acquire, upon receipt of the data search request, the actual target search field in the data search request; and
   calculate a second Hash value corresponding to the actual target search field, convert the second Hash value into a binary number, and extract preset-length data from the end of a converted second number to serve as the target search field identifier information.

19. The electronic device according to claim 7, the processor is further configured to:
   adjust a quantity of the sub-databases according to a total quantity of the security protection terminals.

20. The method according to claim 1, wherein a quantity of the sub-databases can be adjusted according to a total quantity of the security protection terminals.

* * * * *